US009599342B2

(12) United States Patent
Leblond et al.

(10) Patent No.: US 9,599,342 B2
(45) Date of Patent: Mar. 21, 2017

(54) ANNULAR COMBUSTION CHAMBER FOR A TURBINE ENGINE INCLUDING IMPROVED DILUTION OPENINGS

(75) Inventors: Nicolas Christian Raymond Leblond, Paris (FR); Jacques Marcel Arthur Bunel, Thiais (FR); Dominique Maurice Jacques Lains, Crisenoy (FR)

(73) Assignee: SNECMA, Paris (FR)

( * ) Notice: Subject to any disclaimer, the term of this patent is extended or adjusted under 35 U.S.C. 154(b) by 804 days.

(21) Appl. No.: 14/001,429

(22) PCT Filed: Feb. 20, 2012

(86) PCT No.: PCT/FR2012/050355
§ 371 (c)(1),
(2), (4) Date: Aug. 23, 2013

(87) PCT Pub. No.: WO2012/114030
PCT Pub. Date: Aug. 30, 2012

(65) Prior Publication Data
US 2013/0333387 A1 Dec. 19, 2013

(30) Foreign Application Priority Data
Feb. 25, 2011 (FR) ...................................... 11 51561

(51) Int. Cl.
*F23R 3/00* (2006.01)
*F23R 3/06* (2006.01)
*F23R 3/50* (2006.01)

(52) U.S. Cl.
CPC ................ *F23R 3/002* (2013.01); *F23R 3/06* (2013.01); *F23R 3/50* (2013.01);
(Continued)

(58) Field of Classification Search
CPC .... F23R 3/00; F23R 3/002; F23R 3/02; F23R 3/04; F23R 3/06; F23R 3/50; F23R 3/52
See application file for complete search history.

(56) References Cited

U.S. PATENT DOCUMENTS

| 6,260,359 B1 * | 7/2001 | Monty | ...................... F23R 3/06 60/732 |
| 6,427,446 B1 * | 8/2002 | Kraft | ......................... F23R 3/06 60/737 |

(Continued)

FOREIGN PATENT DOCUMENTS

| CN | 101943421 A | 1/2011 |
| EP | 1 281 916 | 2/2003 |
| EP | 1 363 075 | 11/2003 |

OTHER PUBLICATIONS

U.S. Appl. No. 14/070,698, filed Nov. 4, 2013, Bunel, et al.
International Search Report Issued Jun. 26, 2012 in PCT/FR12/050355 Filed Feb. 20, 2012.

*Primary Examiner* — Craig Kim
(74) *Attorney, Agent, or Firm* — Oblon, McClelland, Maier & Neustadt, L.L.P.

(57) ABSTRACT

An annular wall for an annular turbine engine combustion chamber, including one annular row of dilution orifices including larger area orifices and smaller area orifices, and a multi-perforation formed from micro-perforations distributed as an upstream row, a downstream row, and at least one intermediate row interrupted by the orifices, a geometric ratio being defined as the quotient obtained by dividing the maximum spacing L between any two points on the edge of the orifice measured along a direction parallel to an axis of the wall by the maximum spacing l between any two points on the edge of this orifice measured along a direction perpendicular to the axis, the geometric ratio of the larger area orifices being greater than or equal to 1, and the geometric ratio of the smaller area orifices being greater than the geometric ratio of the larger area orifices.

9 Claims, 2 Drawing Sheets

(52) U.S. Cl.
CPC .............. *F23R 2900/03041* (2013.01); *F23R 2900/03042* (2013.01); *Y02T 50/675* (2013.01)

(56) References Cited

U.S. PATENT DOCUMENTS

| | | | | |
|---|---|---|---|---|
| 6,513,331 | B1* | 2/2003 | Brown | F23R 3/06 60/754 |
| 6,543,233 | B2* | 4/2003 | Young | F23R 3/08 60/752 |
| 7,895,841 | B2* | 3/2011 | Johnson | F23R 3/06 60/752 |
| 7,942,005 | B2* | 5/2011 | Bessagnet | F23R 3/06 60/752 |
| 8,099,961 | B2* | 1/2012 | Gerendas | F23R 3/002 60/752 |
| 8,616,004 | B2* | 12/2013 | Zupanc | F23R 3/06 60/754 |
| 9,322,554 | B2* | 4/2016 | Kim | F23R 3/06 |
| 2003/0027093 | A1 | 2/2003 | Kutter et al. | |
| 2003/0167772 | A1 | 9/2003 | Farmer et al. | |
| 2003/0213250 | A1 | 11/2003 | Pacheco-Tougas et al. | |
| 2005/0081526 | A1 | 4/2005 | Howell et al. | |
| 2007/0227149 | A1* | 10/2007 | Biebel | F23R 3/06 60/752 |
| 2010/0077763 | A1 | 4/2010 | Alkabie | |
| 2011/0000215 | A1 | 1/2011 | Lacy et al. | |

\* cited by examiner

ANNULAR COMBUSTION CHAMBER FOR A TURBINE ENGINE INCLUDING IMPROVED DILUTION OPENINGS

TECHNICAL FIELD

This invention relates to the field of annular combustion chambers for turbine engines like those used on aircraft.

It more particularly concerns dilution air inlet orifices formed in the coaxial walls of these combustion chambers.

STATE OF PRIOR ART

Turbine engines comprise at least one turbine arranged downstream from a combustion chamber to extract energy from a primary flow of gases ejected from this combustion chamber and drive a compressor arranged upstream from the combustion chamber and supplying this chamber with high pressure air.

The appended FIG. 1 shows a typical example of a turbine engine combustion chamber 10 comprising two coaxial annular walls, one radially inner wall 12 and one radially outer wall 14, that extend from the upstream side towards the downstream side along the flow direction 16 of the primary gas flow in the turbine engine, about axis 18 of the combustion chamber, and that are connected to each other at their upstream end by an annular chamber bottom wall 20 that extends approximately radially around the above-mentioned axis 18. This annular chamber bottom wall 20 is fitted with injection systems 22 distributed around this axis to bring air and fuel into the combustion chamber.

In general, combustion chambers are composed of an upstream internal region 24 usually called the primary zone, and a downstream internal region 26 usually called the dilution zone.

The primary zone 24 of a combustion chamber is designed for combustion of the air and fuel mix and is supplied with air not only through the injection systems 22 but also through air inlet orifices 28, currently called primary orifices, formed in the coaxial walls 12 and 14 of the chamber around the primary zone 24 of this chamber, in one or several annular rows.

The dilution zone 26 is designed to dilute and to cool gases derived from combustion in the primary zone, and to confer an optimum temperature profile onto the flow of these gasses as they pass through the turbine mounted downstream from the combustion chamber. To achieve this, the coaxial walls 12 and 14 of the combustion chamber comprise at least one row of air inlet orifices 30 on the downstream side of the above mentioned primary orifices 28, usually called dilution orifices.

During operation, a part 32 of an airflow 34 originating from a compressor outlet 36 supplies the injection systems 22 while another part 38 of this airflow bypasses the combustion chamber and flows in the downstream direction along the coaxial walls 12 and 14 of this chamber and in particular supplies the primary orifices 28 and the dilution orifices 30.

As shown in the appended FIG. 2 that shows a developed plan view of a part 31 of the annular wall of the combustion chamber including an annular row of dilution orifices 30 with a circular section, these orifices conventionally include orifices 40 with a larger cross-sectional area and orifices 42 with a smaller cross-sectional area.

Each of the dilution orifices 40 with the larger area may for example be centred relative to the axis 44 (FIG. 1) of a corresponding injection system 22, while the dilution orifices 42 with the smaller area are inserted between the orifices 40 with the larger area and for example there may be three times as many of them as the larger orifices (FIG. 2).

It is usually necessary to cool the coaxial annular walls 12, 14 of the combustion chambers, taking account of the high temperatures reached by gases during combustion.

Multi-perforation is a known technique for achieving this, and consists of the formation of a plurality of micro-perforations 46 (FIG. 2), in other words small orifices with a diameter of about 0.6 mm, normally with an inclined axis, in some regions of the coaxial walls 12, 14 of the combustion chambers. Part of the relatively cool airflow 38 bypassing these combustion chambers can penetrate into them through these micro-perforations and form a cooling air film along the internal faces of the coaxial walls 12 and 14 of these combustion chambers.

However during operation, the coaxial walls 12, 14 of the combustion chambers expand as their temperature increases and high vibrations are applied to them, that can create high stresses that can cause the appearance of cracks or fissures, particularly at the edges of the dilution orifices 30.

A minimum separation between the dilution orifices 30 and a perimeter without any micro-perforations around each of these orifices are usually provided to limit the risks of development and extension of such cracks.

Furthermore, since the micro-perforations 46 are usually arranged in homogeneous rows with uniformly spacing along the axial direction, a minimum axial spacing is also provided between these rows of micro-perforations 46.

However, respecting said perimeter without any micro-perforations around the dilution orifices 30 means that some peripheral zones around these orifices are not optimally cooled, particularly concerning the smallest area orifices 42, and particularly when the micro-perforations 46 are arranged in uniformly spaced rows along the axial direction.

This problem is shown in FIG. 2 that shows two annular rows of micro-perforations 46, the upstream row 48 and the downstream row 50 formed on the upstream and downstream sides respectively of the annular row of dilution orifices 30, and three intermediate rows 52 of micro-perforations 46 that are arranged between the upstream row 48 and the downstream row 50 mentioned above and that are interrupted by dilution orifices 30, the constant axial spacing between two consecutive rows of micro-perforations 46 being marked d in this figure.

Respecting said perimeter without any micro-perforations induces the existence of relatively large and extended zones without micro-perforations, at the upstream part 54 and the downstream part 56 of the periphery of each of the dilution orifices 42 with the smaller area, which can result in insufficient cooling of the upstream part 54 and the downstream part 56.

PRESENTATION OF THE INVENTION

In particular, the purpose of the invention is to simply, economically and efficiently improve cooling of the periphery around dilution orifices of a combustion chamber, to at least partially avoid the above mentioned disadvantages.

To achieve this, the invention discloses an annular wall for an annular turbine engine combustion chamber comprising at least one annular row of dilution air inlet orifices comprising two types of orifices differentiated by their cross-sectional area, namely orifices with a larger area and orifices with a smaller area, as well as a multi-perforation for cooling said wall, said multi-perforation being formed from micro-perforations that have a cross-sectional area less than the area of each of said dilution air inlet orifices and that are distributed as an upstream annular row and a downstream annular row formed on the upstream side and downstream side respectively of said row of dilution air inlet orifices, and as at least one intermediate annular row interrupted by these dilution air inlet orifices, a geometric ratio being defined for each of the dilution air inlet orifices as the quotient obtained by dividing the maximum spacing between any two points on the edge of this orifice measured along a direction parallel to an axis of revolution of the wall, by the maximum spacing between any two points on the edge of this orifice measured along a direction perpendicular to this axis.

According to the invention:
the above mentioned geometric ratio is greater than or equal to 1, for said dilution air inlet orifices with the larger area, and
this geometric ratio of said dilution air inlet orifices with the smaller area is greater than the geometric ratio of said dilution air inlet orifices with the larger area.

The conformation of the dilution air inlet orifices with the smaller area is such that the upstream and downstream rows of micro-perforations in the upstream and downstream parts can be brought closer to the edges of these orifices and therefore zones without any micro-perforations that occur in known types of walls as explained above, can be reduced or even eliminated. The result is more uniform cooling around the periphery of these orifices.

Furthermore, conformation of the dilution air inlet orifices with the smaller cross-sectional area is such that a sufficient circumferential separation can be maintained between all the dilution orifices, and this spacing can even be increased in some cases, for example between two adjacent orifices with the smaller area or between an orifice with the larger area and an orifice with the smaller area adjacent to each other.

Maintaining the circumferential spacing between adjacent dilution orifices can limit the risks of cracks or fissures appearing at the edge of these orifices.

The increase in the circumferential spacing between adjacent dilution orifices also makes it possible to increase the circumferential range of the angular sectors of intermediate rows of micro-perforations formed between these orifices, and therefore to further improve cooling provided by the multi-perforation.

In one preferred embodiment of the invention, the dilution air inlet orifices with the larger area are circular in shape and the dilution air inlet orifices with the smaller area are oval in shape.

In this case, the geometric ratio mentioned above is equal to 1 for the dilution air inlet orifices with the larger cross sectional area.

The edges of the dilution air inlet orifices of both types advantageously have upstream and/or downstream ends that are circumferentially in line with each other.

Such configuration can minimise differences in cooling between the two types of dilution air inlet orifices.

In the preferred embodiment of the invention, each intermediate annular row of said multi-perforation is interrupted by both types of dilution air inlet orifices.

Multi-perforation thus enables optimum cooling of all of these dilution air inlet orifices.

As a variant, some intermediate rows may be interrupted only by the larger area dilution orifices when this is useful.

Furthermore, the axial spacing between each pair of consecutive rows among said upstream, downstream and intermediate annular rows of said multi-perforation is preferably equal to a constant predetermined value.

Such uniformity in the arrangement of the micro-perforations, which is known in itself, particularly facilitates formation of these micro-perforations.

The invention also relates to an annular combustion chamber for a turbine engine comprising two coaxial annular walls, namely an inner wall and an outer wall, connected to each other by an annular chamber bottom wall, at least one of which is of the type described above.

The invention also relates to a turbine engine comprising an annular combustion chamber of the type mentioned above.

BRIEF DESCRIPTION OF THE DRAWINGS

The invention will be better understood and other details, advantages and characteristics of it will become clear after reading the following description given as a non-limitative example with reference to the appended drawings in which.

Identical references are used to denote identical or similar elements in all of these figures.

DETAILED PRESENTATION OF A PREFERRED EMBODIMENT

Figure 1:
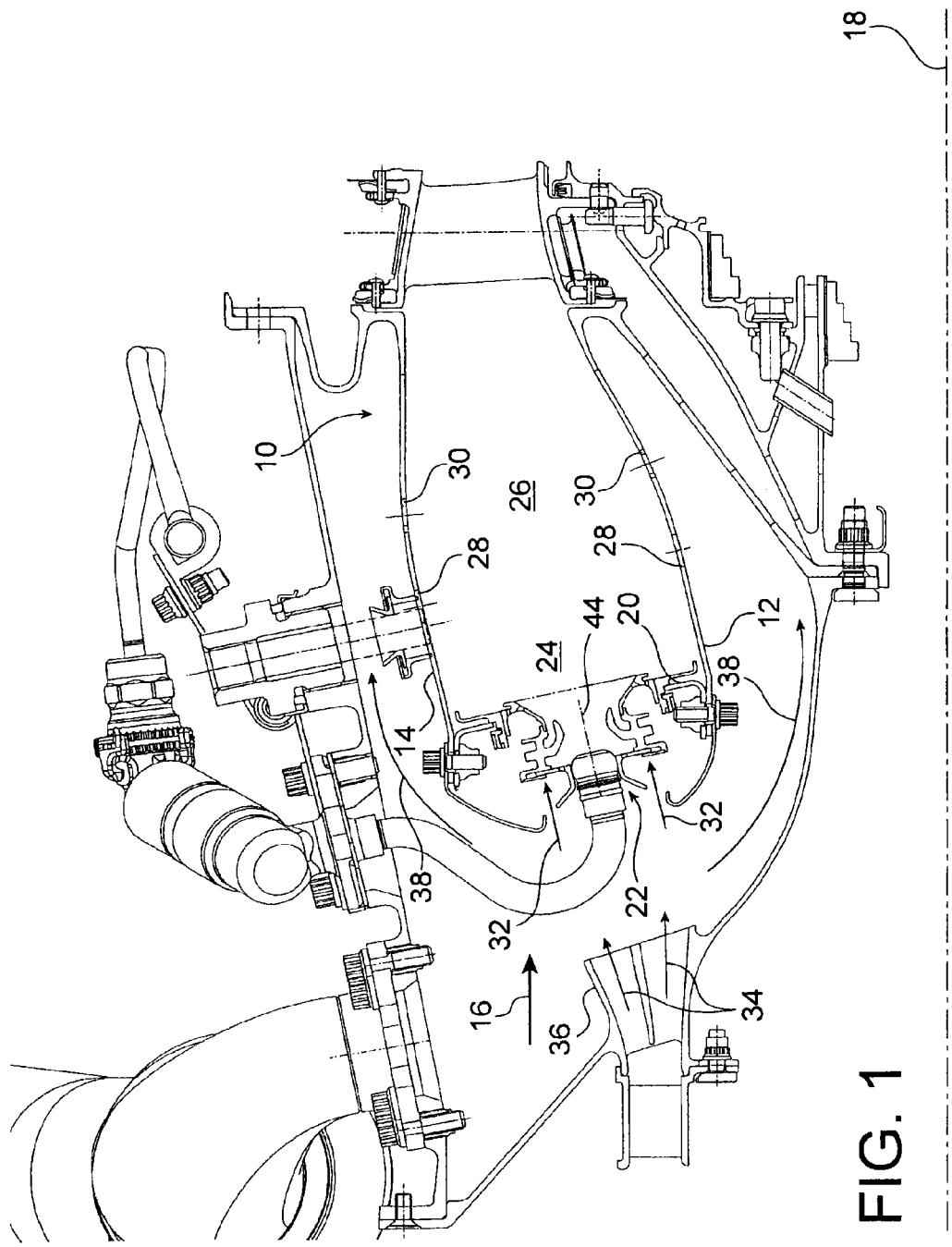
FIG. 1, already described, is a partial diagrammatic view of an axial section of a turbine engine combustion chamber of a known type.
Figure 3:
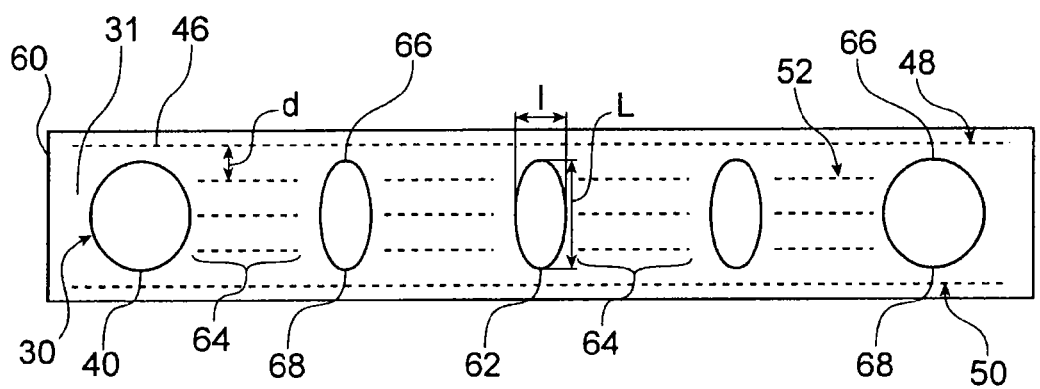
FIG. 3 is a view similar to FIG. 2, of an annular combustion chamber wall according to the invention.

FIG. 3 shows part of an annular wall 60 that will form the inner wall or the outer wall of a turbine engine combustion chamber similar to the combustion chamber in FIG. 1 described above.

Figure 2:
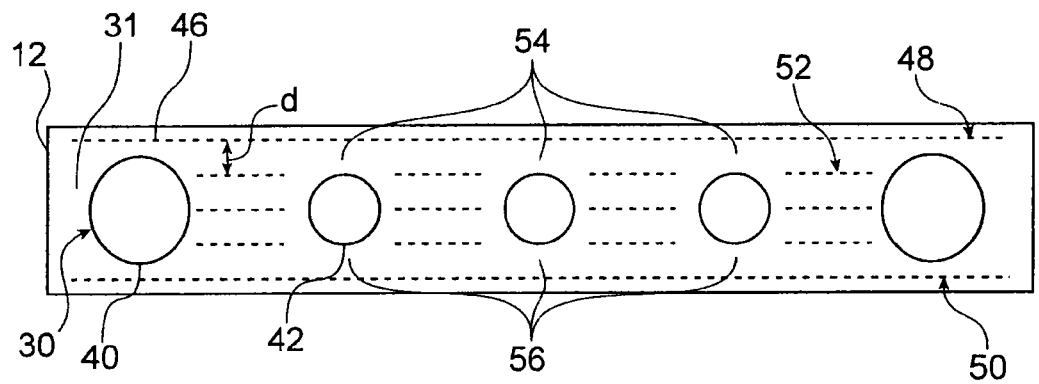
FIG. 2, already described, is a partial developed diagrammatic plan view of an annular wall of the combustion chamber in FIG. 1.

This annular wall 60 is different from the known type of wall shown in FIG. 2 due to the conformation of its dilution air inlet orifices with the smaller cross-sectional area 62 and by the configuration of micro-perforations 46 of this wall.

The dilution air inlet orifices with the smaller cross-sectional area 62 are oval in shape, and have a large axis approximately parallel to the axis of revolution of the combustion chamber.

On the other hand, since the dilution air inlet orifices with the larger cross-sectional area 40 are similar to those of the wall in FIG. 2, the dilution air inlet orifices with the smaller area 62 have an area approximately identical to the area of the dilution air inlet orifices with the smaller area 42 in FIG. 2.

The oval shape of the orifices 62 can increase the circumferential range of each angular sector 64 of the intermediate rows 52 of micro-perforations 46, particularly for angular sectors located between two adjacent orifices with the smaller area 62.

This oval shape can also increase the global density of micro-perforations 46 around the periphery of each dilution orifice with the smaller cross-sectional area 62, and in particular can avoid the existence of zones without any micro-perforations around this perimeter, such as the zones 54 and 56 in FIG. 2.

The oval shape of the orifices 62 is only one example conformation of orifices among many possibilities in which the quotient obtained by dividing the maximum spacing L between any two points on the edge of each orifice measured along a direction parallel to the axis of revolution 18 (FIG. 1) of the wall by the maximum spacing I between any two points on the edge of this orifice measured along a direction perpendicular to this axis 18 is greater than or equal to 1, as regards the orifices 40 with the larger area, and is greater than the quotient for said orifices 40 with the larger cross-sectional area, as regards orifices 62 with the smaller cross-sectional area.

In the example shown in FIG. 3, the upstream ends 66 and downstream ends 68 of the dilution orifices 40 and 62 of the two types are in line circumferentially, for optimum cooling uniformity.

The invention claimed is:

1. An annular wall for an annular turbine engine combustion chamber, comprising:
   at least one annular row of dilution air inlet orifices comprising two types of orifices differentiated by their cross-sectional area of orifices with a larger area and orifices with a smaller area; and
   a multi-perforation for cooling the wall, the multi-perforation including micro-perforations that have a cross-sectional area less than an area of each of the dilution air inlet orifices and that are distributed as an upstream annular row and a downstream annular row formed on an upstream side and downstream side respectively of the row of dilution air inlet orifices, and as at least one intermediate annular row interrupted by the dilution air inlet orifices, a geometric ratio being defined for each of the dilution air inlet orifices as the quotient obtained by dividing a maximum spacing between any two points on an edge of the orifice measured along a direction parallel to an axis of revolution of the wall by a maximum spacing between any two points on an edge of the orifice measured along a direction perpendicular to the axis of revolution;
   wherein the geometric ratio of the dilution air inlet orifices with the larger area is greater than or equal to 1, and
   wherein the geometric ratio of the dilution air inlet orifices with the smaller area is greater than the geometric ratio of the dilution air inlet orifices with the larger area.

2. A wall according to claim 1, wherein the dilution air inlet orifices with the larger area are circular in shape and the dilution air inlet orifices with the smaller area are oval in shape.

3. A wall according to claim 1, wherein the edges of the two types of the dilution air inlet orifices have respective upstream and downstream ends that are circumferentially in line with each other.

4. A wall according to claim 1, wherein each intermediate annular row of the multi-perforation is interrupted by the two types of dilution air inlet orifices.

5. A wall according to claim 1, wherein an axial spacing between each pair of consecutive rows among the upstream, downstream, and intermediate annular rows of the multi-perforation is equal to a constant predetermined value.

6. An annular combustion chamber for a turbine engine, comprising:
   two coaxial annular walls, of an inner wall and an outer wall, connected to each other by an annular chamber bottom wall,
   wherein at least one of the coaxial annular walls is a wall according to claim 1.

7. A turbine engine, comprising an annular combustion chamber according to claim 6.

8. A wall according to claim 1, wherein the edges of the two types of the dilution air inlet orifices have respective upstream or downstream ends that are circumferentially in line with each other.

9. A wall according to claim 1, wherein a plurality of the dilution air inlet orifices with the smaller area are positioned between an adjacent pair of the dilution air inlet orifices with the larger area.

* * * * *